United States Patent
Arimilli et al.

[11] Patent Number: 6,061,757
[45] Date of Patent: May 9, 2000

[54] HANDLING INTERRUPTS BY RETURNING AND REQUEUING CURRENTLY EXECUTING INTERRUPTS FOR LATER RESUBMISSION WHEN THE CURRENTLY EXECUTING INTERRUPTS ARE OF LOWER PRIORITY THAN NEWLY GENERATED PENDING INTERRUPTS

[75] Inventors: Ravi Kumar Arimilli, Round Rock; John Michael Kaiser; Warren Edward Maule, both of Cedar Park, all of Tex.

[73] Assignee: International Business Machines Corporation, Armonk, N.Y.

[21] Appl. No.: 08/969,645

[22] Filed: Nov. 13, 1997

Related U.S. Application Data

[63] Continuation of application No. 08/536,826, Sep. 29, 1995, abandoned.

[51] Int. Cl.[7] .................................................. G06F 13/14
[52] U.S. Cl. ........................................ 710/264; 710/128
[58] Field of Search .................... 395/733–742; 710/260–269

[56] References Cited

U.S. PATENT DOCUMENTS

| | | | |
|---|---|---|---|
| 4,023,143 | 5/1977 | Braunstein | 395/736 |
| 4,839,800 | 6/1989 | Barlow et al. | 395/737 |
| 5,404,535 | 4/1995 | Barlow et al. | 395/737 |
| 5,438,677 | 8/1995 | Adams et al. | 395/736 |
| 5,511,200 | 4/1996 | Jayakumar | 395/739 |
| 5,564,060 | 10/1996 | Mahalingaiah et al. | 395/871 |

OTHER PUBLICATIONS

*Description of Intel® 8259 Controller*,Intel® Peripheral Components Catalog, 1988, Intel Corp. Literature Department, 3065 Bowers Avenue, Santa Clara, California.

*Primary Examiner*—Ayaz R. Sheikh
*Assistant Examiner*—Sumati Lefkowitz
*Attorney, Agent, or Firm*—Russell D. Culbertson; Anthony V.S. England

[57] ABSTRACT

An information handling system includes one or more processing units, a data management unit, connected to the processor data bus, to a memory system, and to an I/O bus, an address management unit, connected to the processor address bus, to the memory system, and to an I/O bus. Data management unit also includes interrupt routing logic which snoops interrupt packets, stores the information in registers, and generates a signal indicating whether a particular interrupt was accepted or rejected. If the interrupt logic has a higher priority interrupt pending, the current interrupt packet will be returned to the requesting device using the interrupt return transaction, and the requesting device will accept the return transaction by decoding the bus unit ID field in the packet. The interrupt will be requeued and held in a pending status until an interrupt reissue transaction is transmitted by the interrupt routing logic and received by the interrupting I/O controller. Interrupts may be generated by any I/O device connected to any of I/O controllers on the I/O bus, or by a high speed I/O device connected to processor address bus.

4 Claims, 13 Drawing Sheets

HANDLING INTERRUPTS BY RETURNING AND REQUEUING CURRENTLY EXECUTING INTERRUPTS FOR LATER RESUBMISSION WHEN THE CURRENTLY EXECUTING INTERRUPTS ARE OF LOWER PRIORITY THAN NEWLY GENERATED PENDING INTERRUPTS

This application is a continuation of application Ser. No. 08/536,826, filed on Sep. 29, 1995, which was abandoned upon the filing hereof.

TECHNICAL FIELD OF THE INVENTION

The present invention relates to information handling systems, and more particularly to information handling systems including means for more efficiently signaling interrupts between an interrupt source and an interrupt processor.

BACKGROUND OF THE INVENTION

In data processing systems, interrupts are used to signal a processor that an interrupt condition exists at a given source. This interrupt source could be, for example, an adapter card on a system bus which requires some type of service. The required service may be to initiate a transfer of data or to read a status register that has recently changed.

When the processor has been conditioned to accept an interrupt, otherwise known as having the interrupts enabled, the processor will initiate interrupt processing upon the receipt of the interrupt. This interrupt processing typically involves the processor interrogating the source of the interrupt, performing functions based upon the type of interrupt, and resetting/turning off the interrupt.

Interrupt priorities have also been accommodated in traditional systems. If more than one interrupt signal is active at a given time, the use of interrupt priorities tells the processor which interrupt to service first.

Interrupt controllers have been designed to offload certain interrupt handshake functions that are required, such as resetting an interrupt signal. Typical of such interrupt controllers is an Intel 8259 controller, which is described in the Intel Component Data Catalog, 1988 (available from Intel Corp. Literature Department, 3065 Bowers Avenue, Santa Clara, Calif.), and hereby incorporated by reference as background material. These interrupt controllers can monitor multiple interrupt sources and only interrupt the processor using a single interrupt line.

Current interrupt signalling methods were primarily designed for uniprocessor systems with few interrupt sources or priority levels. Most systems send interrupts over one or more interrupt lines hardwired on the planar. In a multiprocessor environment, where there is more than one processor capable of servicing an interrupt, these types of interrupt signalling techniques cause increases in bus complexity. An interrupt signal from each interrupt source would have to be wired to each processor or interrupt controller capable of servicing such interrupt.

Attempts to satisfy needs of a multiprocessing data processing system have required dedicated interrupt controllers for each processor in the system. This approach is not only costly but also does not allow for cohesive management of interrupts which are generated from a plurality of sources that must be routed to a plurality of processors for servicing.

A method is needed that is expandable, allowing many interrupt sources and priority levels. In addition, a method of signalling interrupt information is needed for use with multiprocessing systems that handle multiple processors and multiple interrupt controllers.

Current interrupt systems are hardware specific, with varying amounts of software dependencies. A change in the number or types of interrupts requires changes be made to the particular operating system software. An interrupt subsystem is needed that provides software independence from the underlying hardware interrupt structure.

An example of a prior art system which solves many of the problems identified above is U.S. patent application Ser. No. 08/573,918(which is a continuation of Ser. No. 08/124,182) for "Scalable System Interrupt Structure For A Multi Processing System".

However, the prior art systems do not solve the problem addressed and solved by the present invention whereby interrupts are signalled from I/O devices by means of interrupt packets sent to interrupt processing or routing logic where the packets are accepted or rejected by the routing logic according to priority and rejected interrupts are queued in I/O control logic for resending when signalled by an interrupt reissue signal.

SUMMARY OF THE INVENTION

Therefore, it is an object of the present invention to efficiently signal interrupts to processors in an information handling system by interrupt routing logic which snoops interrupt packets to select a highest priority interrupt to be accepted and returning lower priority interrupts which are held by the requesting unit until an interrupt reissue signal is sent to all interrupt requesting units.

Accordingly, an information handling system includes one or more processing units, a data management unit, connected to the processor data bus, to a memory system, and to a I/O bus, an address management unit, connected to the processor address bus, to the memory system, and to an I/O bus. Data management unit also includes interrupt routing logic which snoops interrupt packets, stores the information in registers, and generates a signal indicating whether a particular interrupt was accepted or rejected. If the interrupt logic has a higher priority interrupt pending, the current interrupt packet will be returned to the requesting device using the interrupt return transaction, and the requesting device will accept the return transaction by decoding the bus unit ID field in the packet. The interrupt will be requeued and held in a pending condition until an interrupt resend transaction is transmitted. The interrupt resend transaction is broadcast to all possible interrupt sources on a change in the interrupt priority from a higher to a lower level, typically done when a processor finishes the highest priority interrupt processing with an End Of Interrupt (EOI).

It is an advantage of the present invention that interrupts having different priority are efficiently handled by interrupt routing logic in an information handling system having multiple processors.

The present invention also has a latency advantage over prior art systems where I/O control logic resends a rejected interrupt after a predetermined elapsed time, and it has an efficiency advantage over a system which resends a rejected interrupt immediately.

Other features and advantages of the present invention will become apparent in the following detailed description of the preferred embodiment of the invention taken in conjunction with the accompanying drawings.

BRIEF DESCRIPTION OF THE DRAWING

FIG. 2, including 2A, 2B, and 2C, is a block diagram of a data management unit in accordance with the present invention.

FIG. 3, including 3A, 3B, and 3C, is a block diagram of an address management unit in accordance with the present invention.

FIG. 5, including 5A, 5B, 5C, and 5D, is a flow chart showing interrupt handling in accordance with the present invention.

DETAILED DESCRIPTION OF A PREFERRED EMBODIMENT OF THE INVENTION

Figure 1:
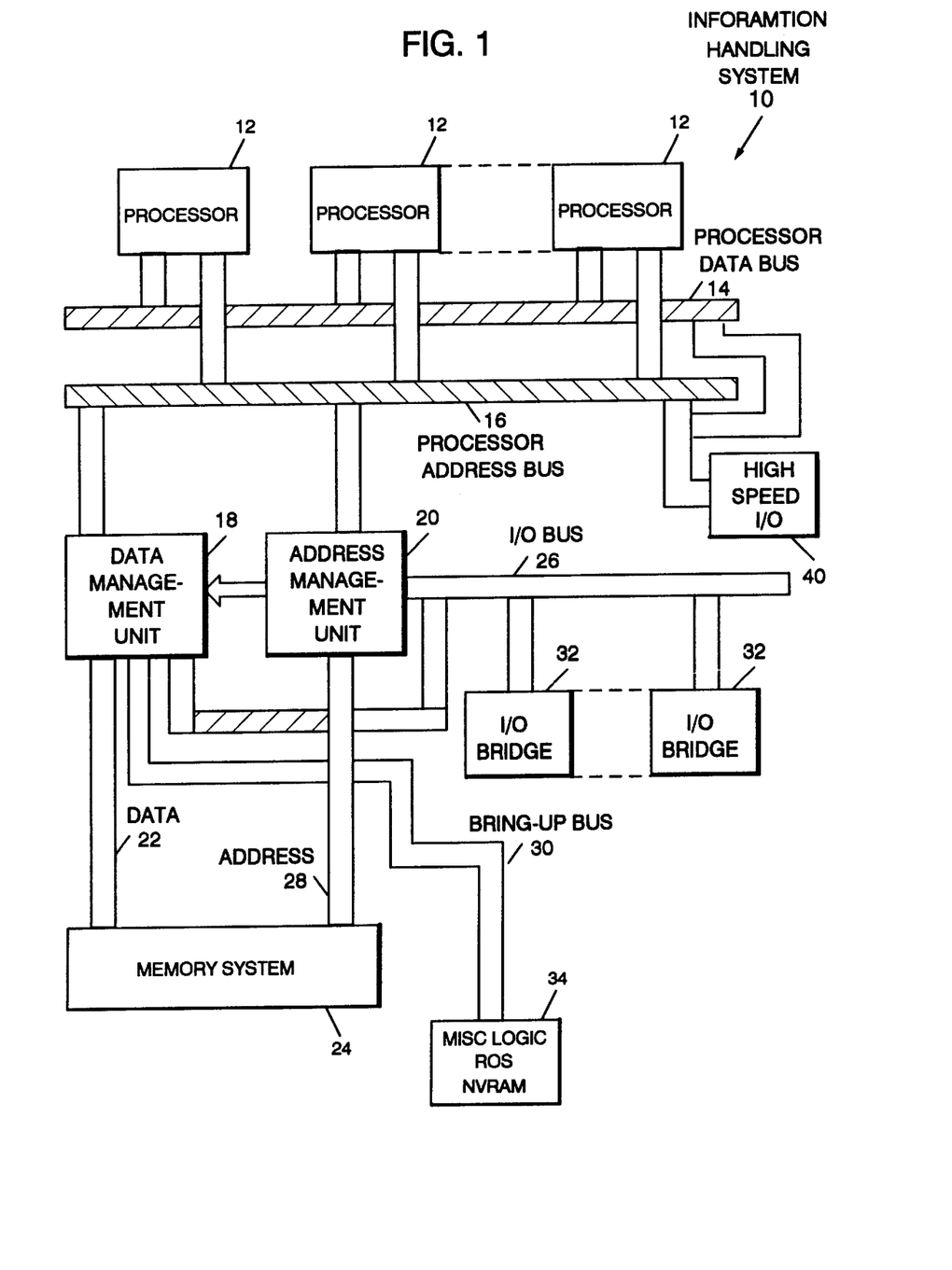
FIG. 1 is a block diagram of an information handling system implementing the present invention.

Referring now to FIG. 1, an information handling system implementing the present invention will be described.

An information handling system 10 includes one or more processing units 12, each having data outputs connected to a processor data bus 14 and having address outputs connected to a processor address bus 16. A data management unit 18 is connected to processor data bus 14 and an address management unit 20 is connected to processor address bus 16. A high speed I/O device controller 40 may also be connected to processor data bus 14 and to processor address bus 16. Data management unit 18 is connected by memory data bus 22 to memory system 24 and by I/O bus 26 to I/O bridges 32. Address management unit 20 is connected to address lines 28 of memory system 24, and to I/O bus 26. I/O bus 26 connects between data and address management units 18, 20 and I/O controllers 32. Bring up bus 30 connects data management unit 18 to a bring up routine storage device 34, which may be implemented as a Read Only Store or a nonvolatile RAM.

Each of the units identified above are well known in the art and will not be described in greater detail herein except for data management unit 18 and address management unit 20.

Figures 2, 2A:
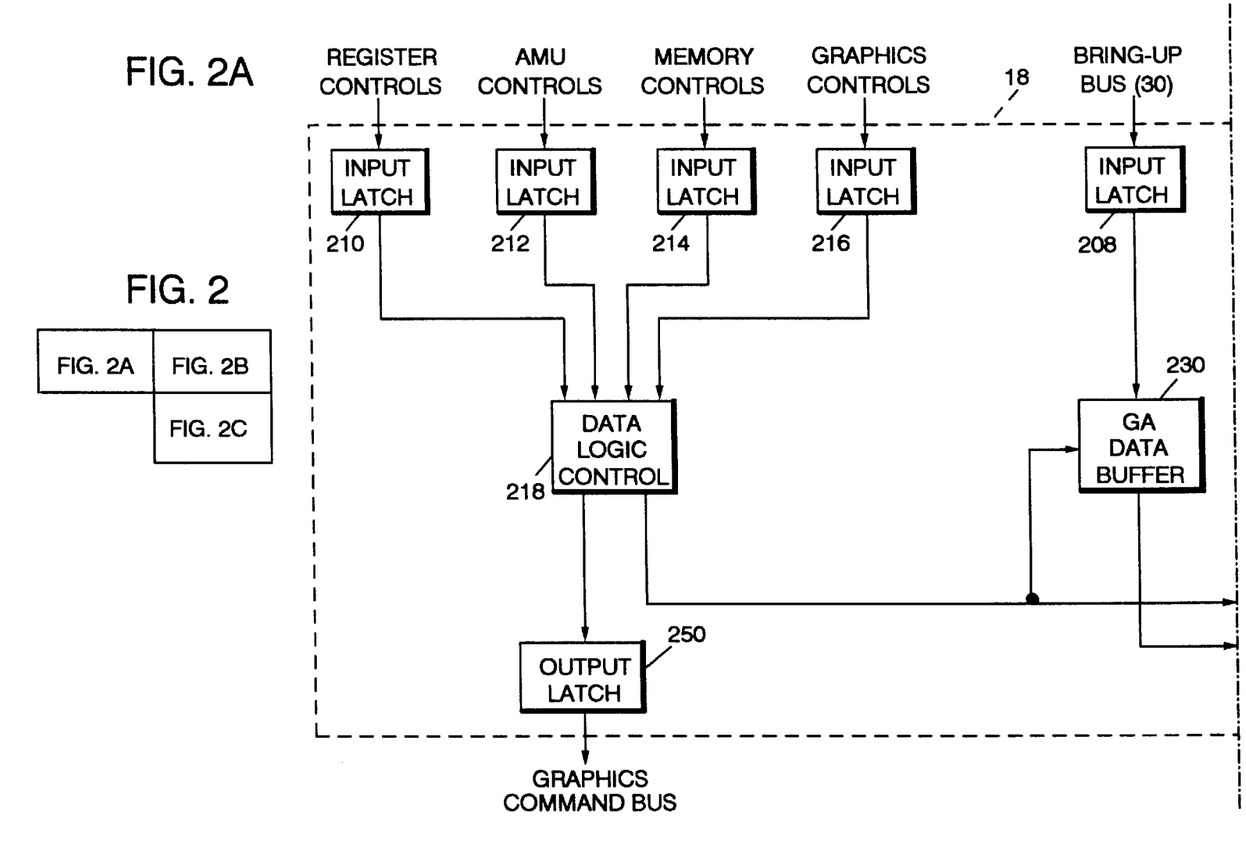
Figure 2B:
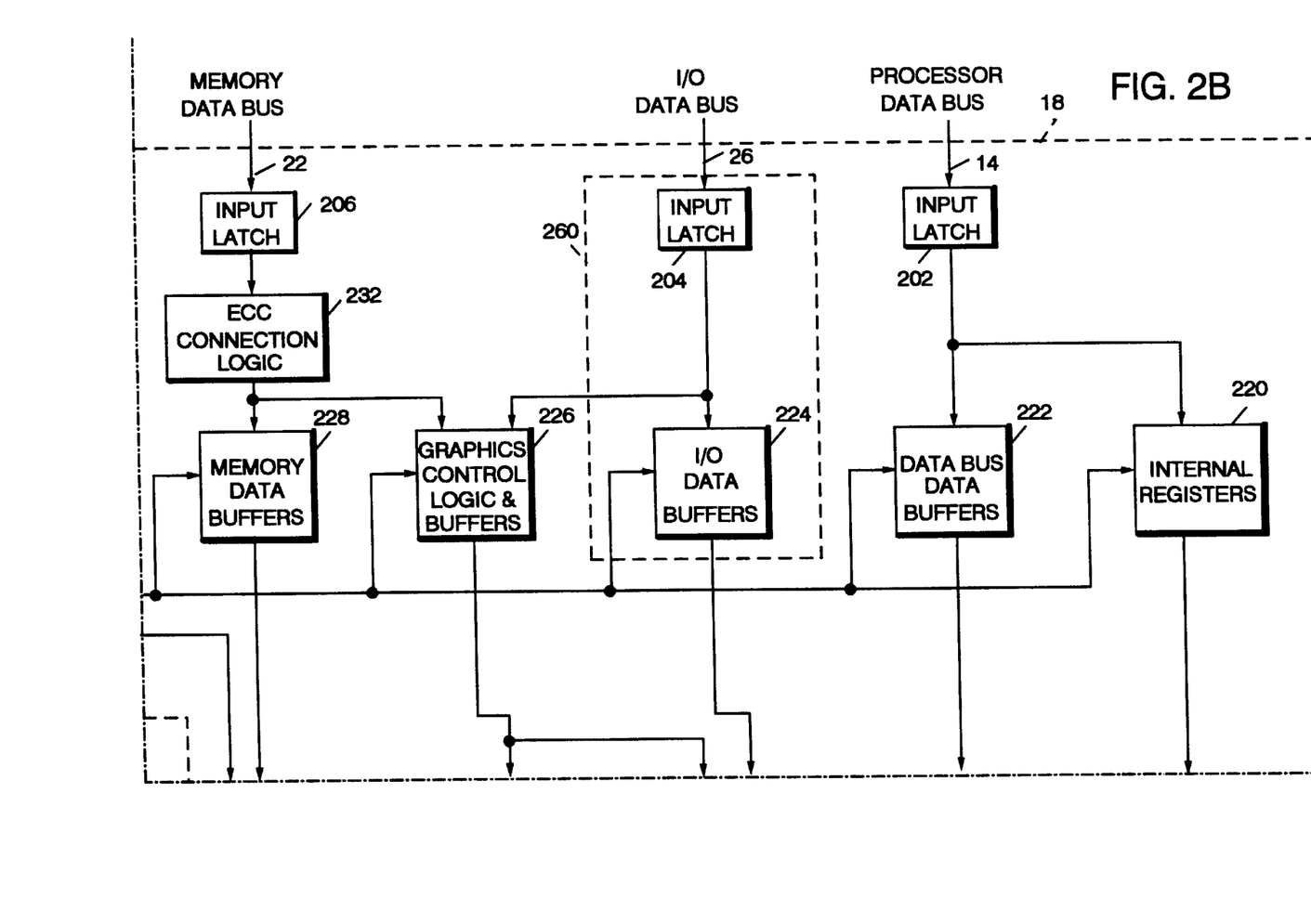
Figure 2C:
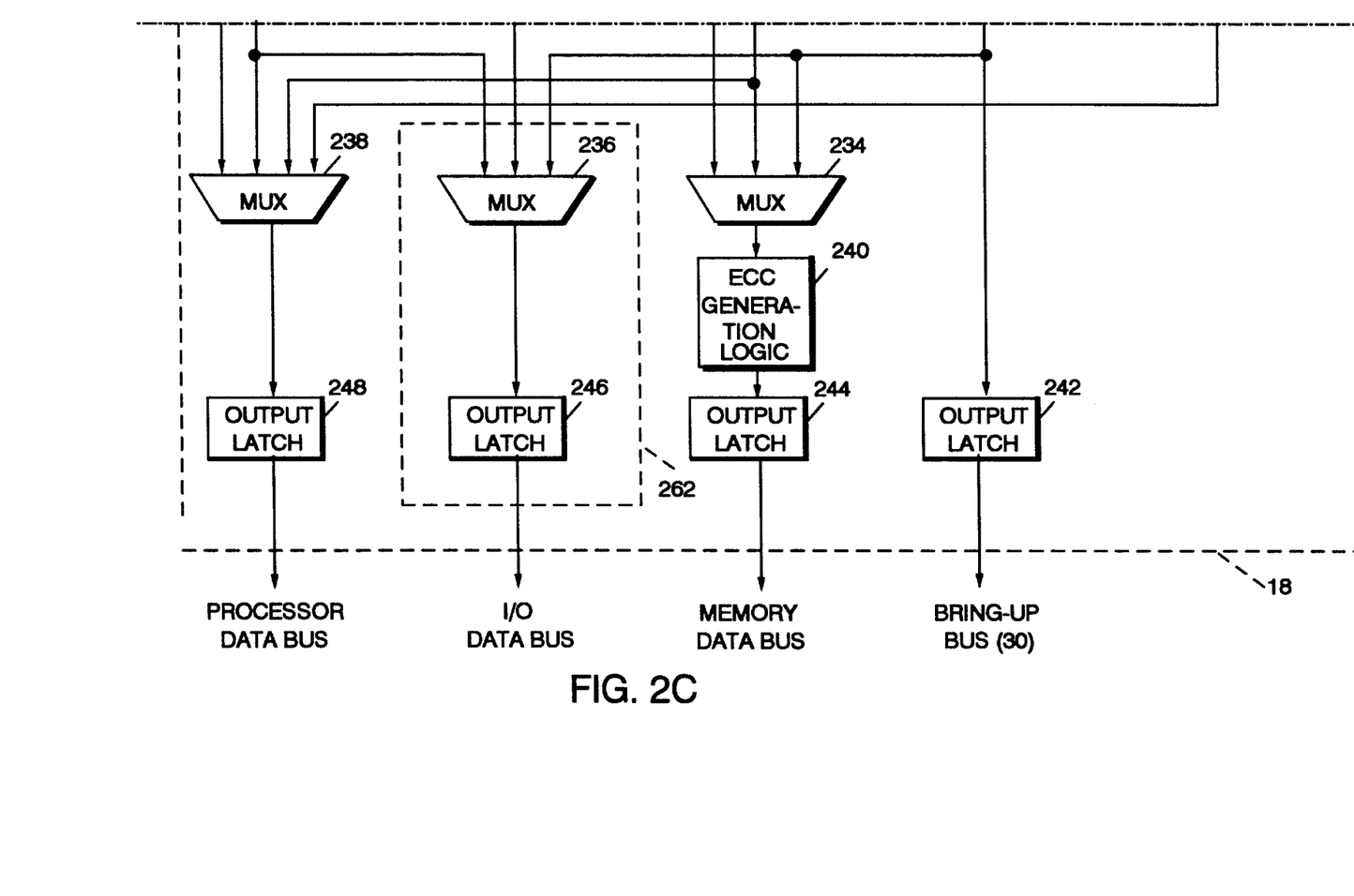

Referring now to FIG. 2, data management unit 18 will be further described.

Data management unit 18 responds to inputs from a number of buses, such as the processor data bus 14, the memory data bus 22, the I/O data bus 26, and a number of control signals generated by address management unit 20.

All of the input signals to data management unit 18 are latched in input latches as follows:

The processor data bus signals are latched at input latches 202, I/O data signals are latched at input latches 204, memory data signals are latched at input latches 206, signals from a graphics data bus are latched at input latches 208.

The control signals from the address management unit 20 are latched as follows:

Internal register controls are stored in input latches 210, processor controls are stored in input latches 212, memory controls are stored in input latches 214, and graphics controls are stored in input latches 216. The outputs of the control latches 210, 212, 214, and 216, inclusive, are input to data control logic 218 which provides control signals for gating data through data management unit 18. Additionally, data control logic 218 also provides an output to output latches 250 which represent graphics commands which are then transmitted to a graphics command bus (not shown).

The outputs of processor data bus latches 202 are connected to inputs of processor bus data buffers 222 and internal registers 220. The outputs of the processor data bus buffer 222 are connected to output latches 242 and to multiplexors 234 and 236. Data is gated out of buffers 222 under the control of data control logic 218. Internal registers 220 have outputs connected to inputs of multiplexor 238. Again, as indicated above, the outputs of internal registers 220 are controlled by data control logic 218.

Outputs of I/O data latches 204 are connected to inputs of I/O data buffer 224 and graphics control logic and buffers 226. Outputs of I/O data buffers 224 are connected as inputs to multiplexor 234 and 238. Outputs of graphics control logic and buffers 226 are connected to multiplexors 234 and 236. Memory data bus input latches 206 have outputs connected to error correction code (ECC) logic 232. Outputs of ECC logic 232 are connected to memory data buffers 228 and to inputs of graphics control logic and buffers 226. Outputs of memory data buffers 228 are connected to multiplexors 236 and 238.

Graphics data bus input latches 208 have outputs connected to graphics adapter data buffer 230 which in turn has outputs connected to multiplexor 238.

As previously indicated, gating of data from registers and buffers 220, 222, 224, 226, 228, and 230 is controlled by data control logic 218. Multiplexors 234, 236, and 238 each have three inputs and, as controlled by data control logic 218, provide an output representing inputs from one of the registers or buffers 220, 222, 224, 226, 228, or 230 to the respective outputs of the multiplexors 234, 236, or 238.

More specifically, the output of multiplexor 234 is connected to ECC generation logic 240 which generates an error correction code for data to be transmitted to memory system 24 (see FIG. 1). The output of ECC generation latch 240 is connected to output latches 244 which in turn are connected to memory data bus 22. The output of multiplexor 236 is connected to output latches 246 which have outputs connected to I/O data bus 26.

Multiplexor 238 has outputs connected to output latches 248 which have outputs connected to the processor data bus 14.

The circuits and logic contained in blocks 260 and 262 which control and pass data for the I/O data bus 26 are clocked asynchronously to the processor data bus 14. A separate clock (not shown) is used to drive the I/O data on bus 26 at a clock speed which is neither synchronous to nor necessarily arithmetically related to the speed of the processor clock on processor bus 14. For example, if a processor bus clock rate is 100 Mhz, it is possible that the I/O data bus clock speed might be 32 Mhz, for example.

By isolating the processor clock from the I/O data clock through the use of the data management unit 18, transactions between processors and the data management unit may be conducted at processor speed without being slowed down by I/O requests running at a lower speed as in the prior art.

Figures 3, 3C:
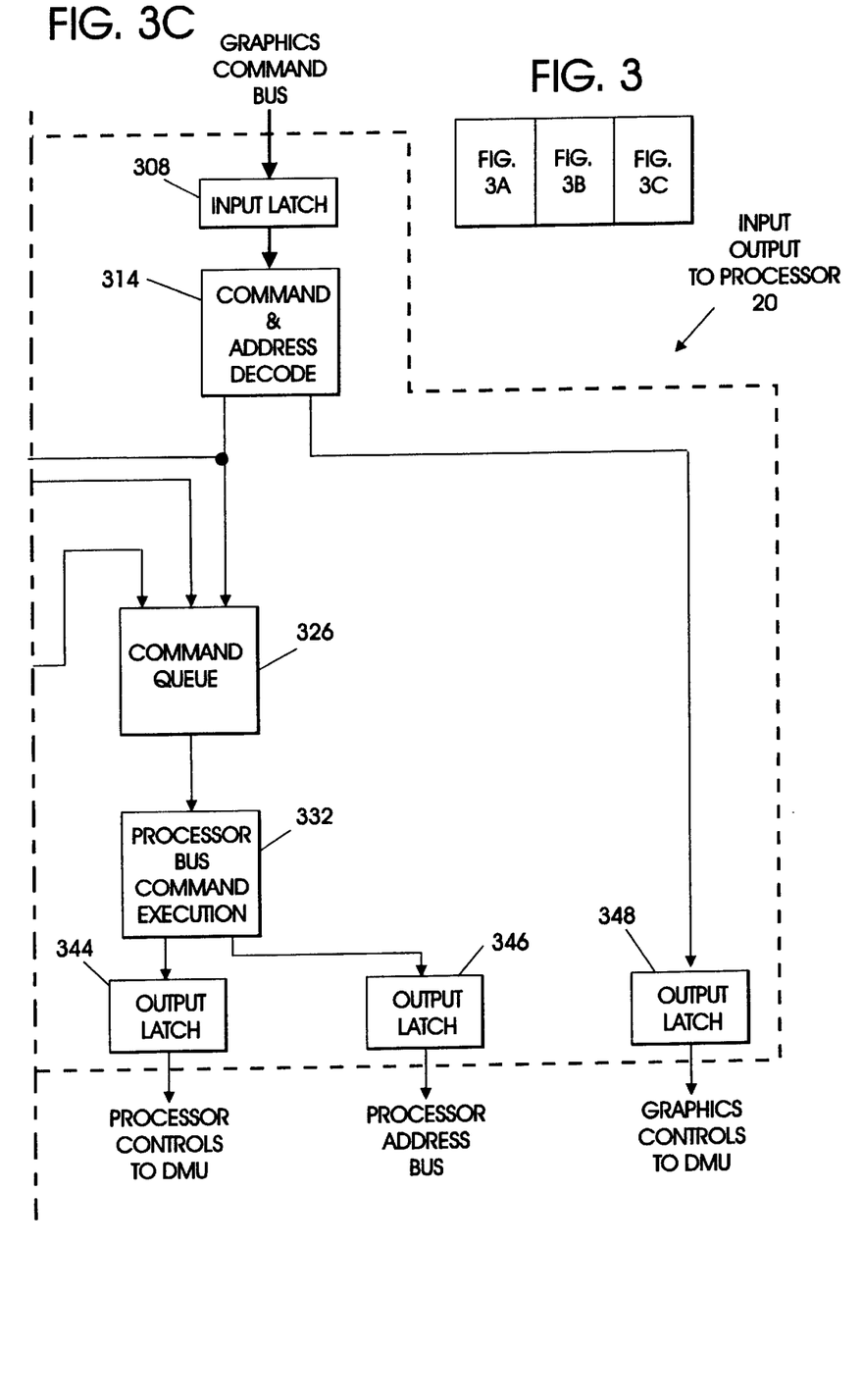
Figure 3A:
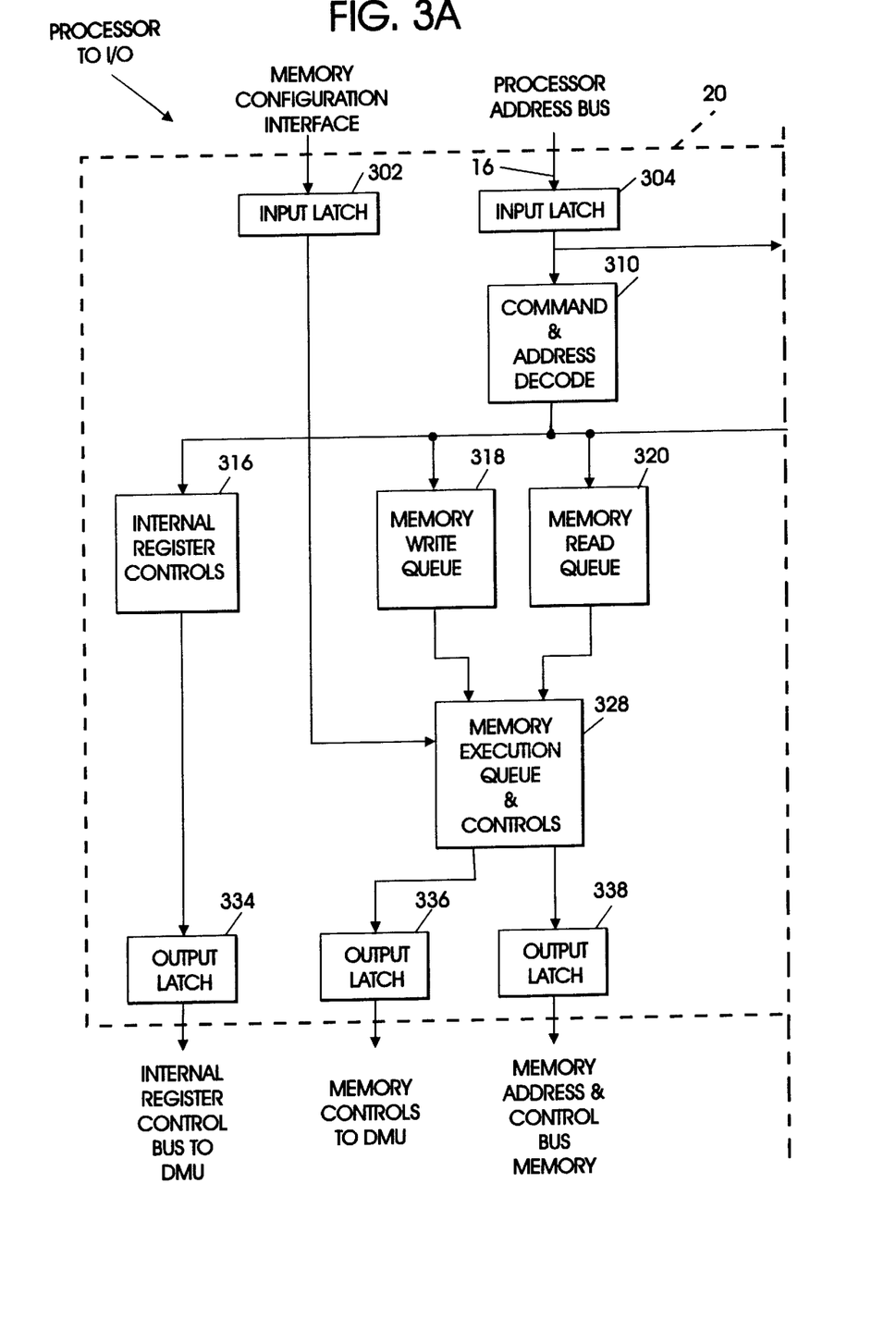
Figure 3B:
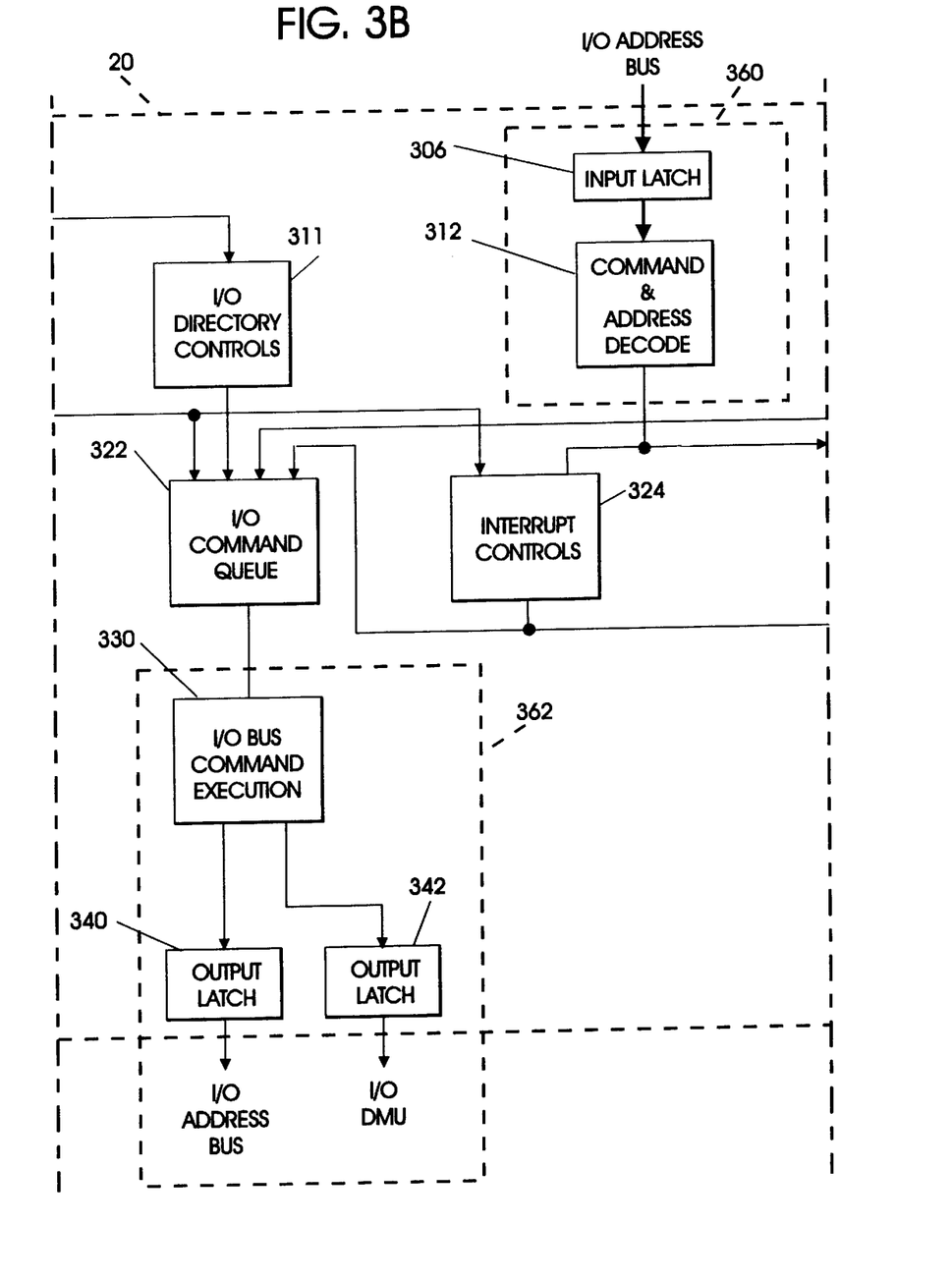

Referring now to FIG. 3, the address management unit in accordance with the present invention will be further described.

The following inputs to address management unit 20 are latched by input latches as follows:

Memory interface signals are connected to input latch 302, processor address bus signals from processor address bus 16 are latched in input latches 304, I/O address signals are latched in input latches 306, and graphics command bus signals are latches in input latches 308. Outputs of input latches 302 are connected to memory execution queue and controls logic 328. Outputs from processor address bus latches 304 are connected to command and address decode logic 310 and to I/O directory control logic 311. Outputs of command and address decode logic 310 are connected as inputs to internal register controls 316, memory write queue 318, memory read queue 320, processor to I/O command queue 322, and interrupt controls 324. An output of I/O directory control logic 311 is connected to processor to I/O command queue 322.

I/O address input latches 306 have outputs connected to command and address decode logic 312. The outputs of command and address decode logic 312 are connected to inputs to interrupt control logic 324 and to I/O to processor command queue logic 326. Graphics command input latches 308 has outputs connected to command and address decode logic 314 which in turn has a first output connected to output latch 348 which generates an output signal to data management unit 18 for the graphics controls. Second outputs of command and address decode logic 314 are connected to processor to I/O command queue logic 322 and I/O to processor command queue logic 326.

Processor to I/O command queue logic 322 and I/O to processor command queue logic 326 each have a third input which is an output from interrupt control logic 324.

Outputs of internal register control logic 316 are connected to inputs of output latches 334 which provide the internal register control signal to data management unit 18. Outputs of memory write queue logic 318 and memory read queue logic 320 are connected to memory execution queue and control logic 328. Also, the outputs from input latch 302 from memory interface are connected to memory execution queue and control logic 328. A first output of memory execution queue in control logic 328 is connected to output latches 336 which provide memory control signals to data management unit 18. Second outputs from memory execution queue and control logic 328 are connected to output latches 338 which provide memory address and control signals to memory 24 (see FIG. 1). Outputs of processor to I/O command queue logic 322 are connected to inputs to I/O command execution logic 330. A first output from I/O command execution logic 330 is latched in latches 340 for transmission to the I/O address bus 26. A second set of outputs from I/O command execution logic 330 is latched by latches 342 and represents the I/O data signals to be transmitted to data management unit 18. Outputs of I/O to processor command queue logic 326 are connected to processor command execution logic 332 which has a first set of outputs connected to output latches 344 which represent the processor controls to be transmitted to the data management unit 18 and a second set of outputs latched in output latches 346 which has outputs connected to the processor address bus 16.

As indicated above with respect to FIG. 2, the I/O bus 26 may operate at a frequency which is different from and asynchronous with the processor data and address buses 14 and 16. The logic included in blocks 360 and 362 related to the I/O address, commands and data as shown in FIG. 3 are operated under the control of the I/O clock referred to above with respect to FIG. 2 which is independent from the processor bus clock and runs asynchronous with respect to the processor bus clock. Thus, address, data, control signals and interrupts on the I/O bus 26 are handled under the control of data management unit 18 and address management unit 20 in such a manner so as to optimize the performance of processors 12 directly connected to processor data bus 14 and processor address bus 16.

INTERRUPT HANDLING APPARATUS AND METHOD

Figure 4:
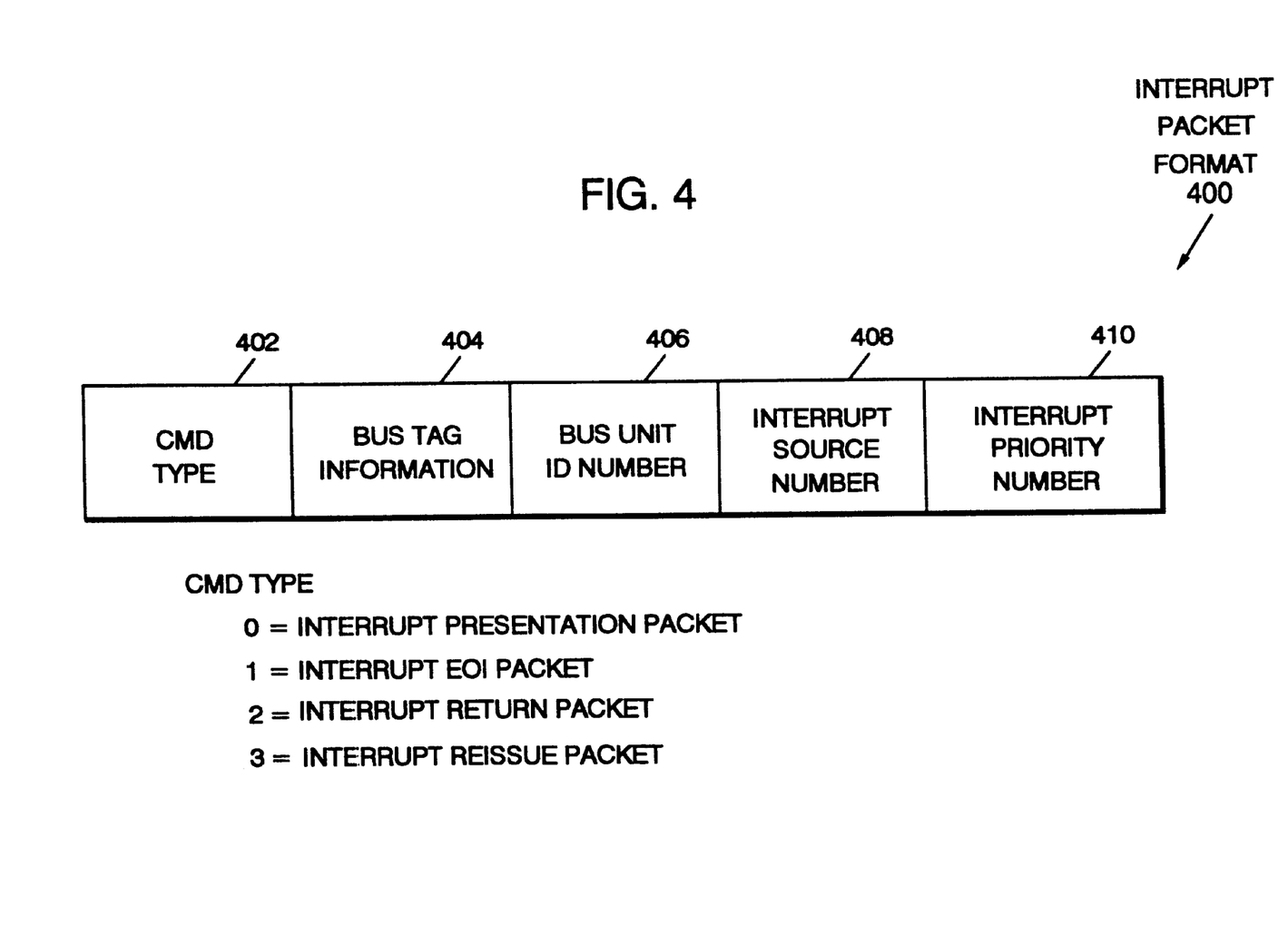
FIG. 4 is a diagram showing interrupt packet formats in accordance with the present invention.

Referring now to FIG. 4, an interrupt packet format will be described.

Each interrupt from a requesting unit which may be, for example, any of I/O controllers 32, must be formatted as is shown in FIG. 4 wherein interrupt packet format 400 includes a command type field 402, a bus tag information field 404, a bus unit ID number field 406, an interrupt source number field 408, and an interrupt priority number field 410. The command type field 402 may include one of four different commands as follows:

Command type 0—interrupt presentation packet;
Command type 1—interrupt end of interrupt packet;
Command type 2—interrupt return packet; and
Command type 3—interrupt reissue packet.

All common interrupt transactions should fall within the above-identified four interrupt command types.

Referring now to FIG. 5, the operation of the interrupt routing logic according to the present invention will be further described. It should be noted that interrupts may be generated by any I/O device connected to any of I/O controllers 32 on I/O bus 26, or by a high speed I/O device connected to processor address bus 16. For reference purposes, FIG. 5 has been broken out into four sections.

Figure 5A:
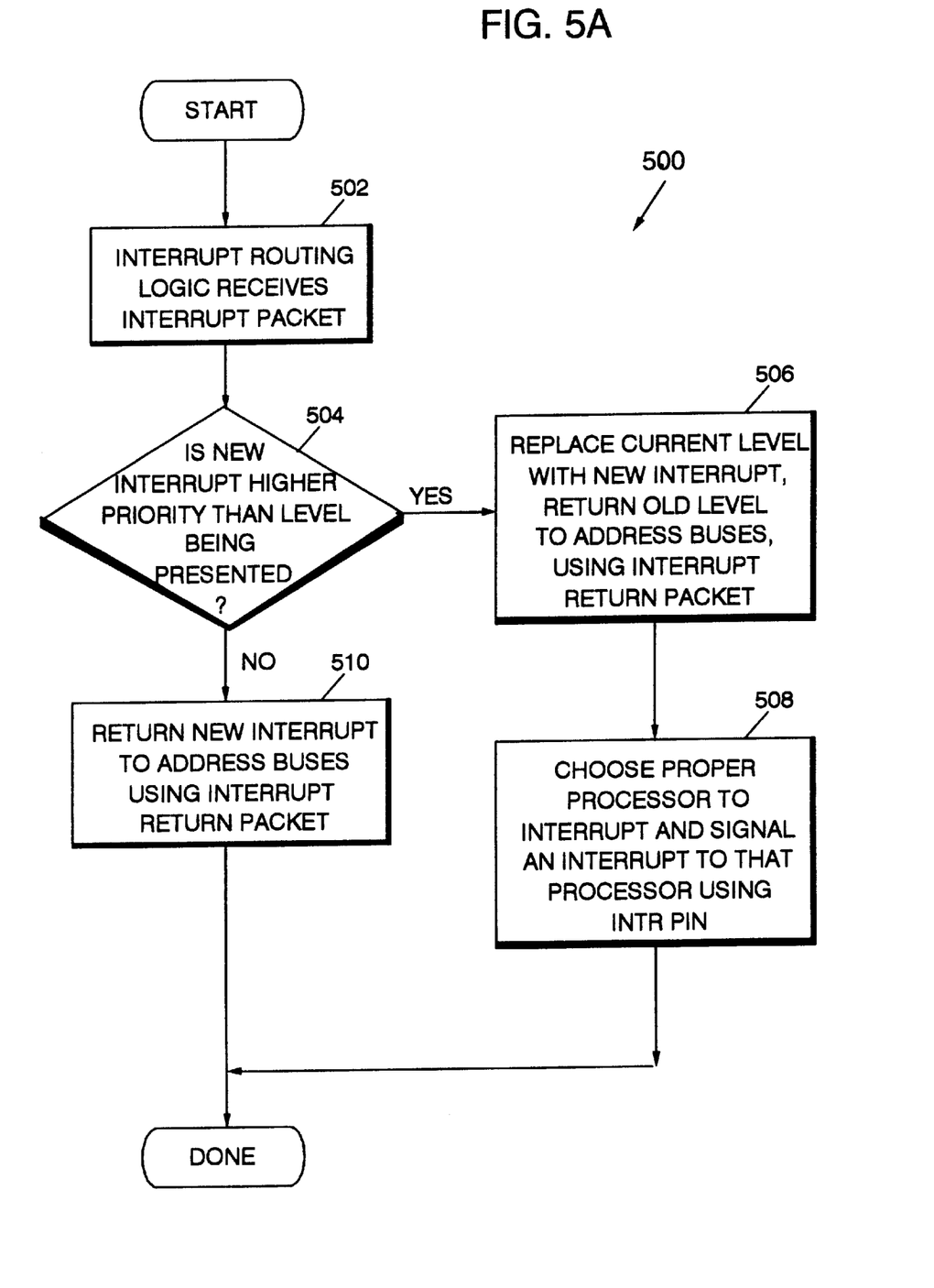

FIG. 5A is a flowchart describing the handling of concurrent interrupt packets by interrupt routing logic 324.

Figure 5B:
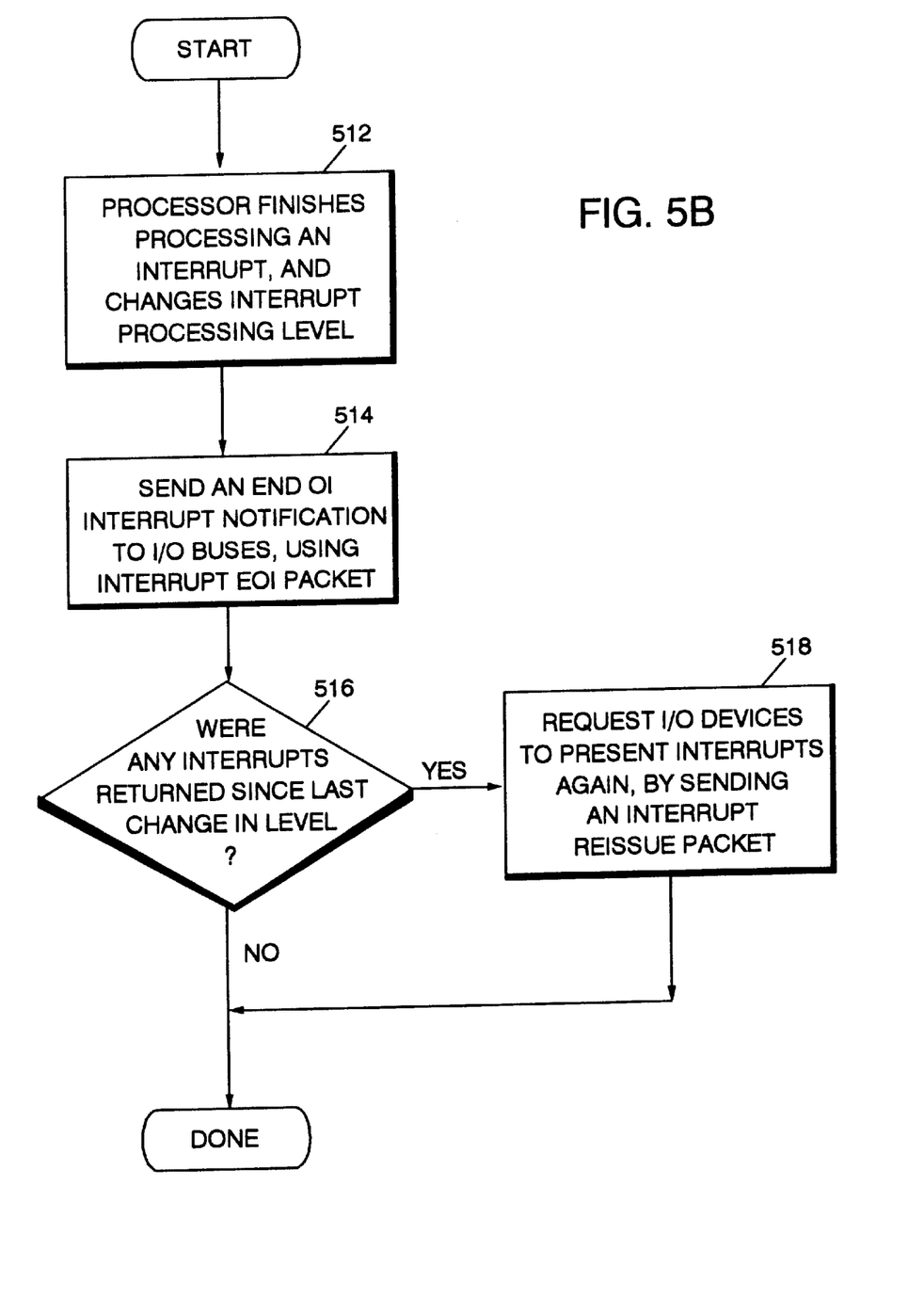

FIG. 5B shows the process for a processor finishing an interrupt, and changing interrupt levels to handle lower priority queued interrupts.

Figure 5C:
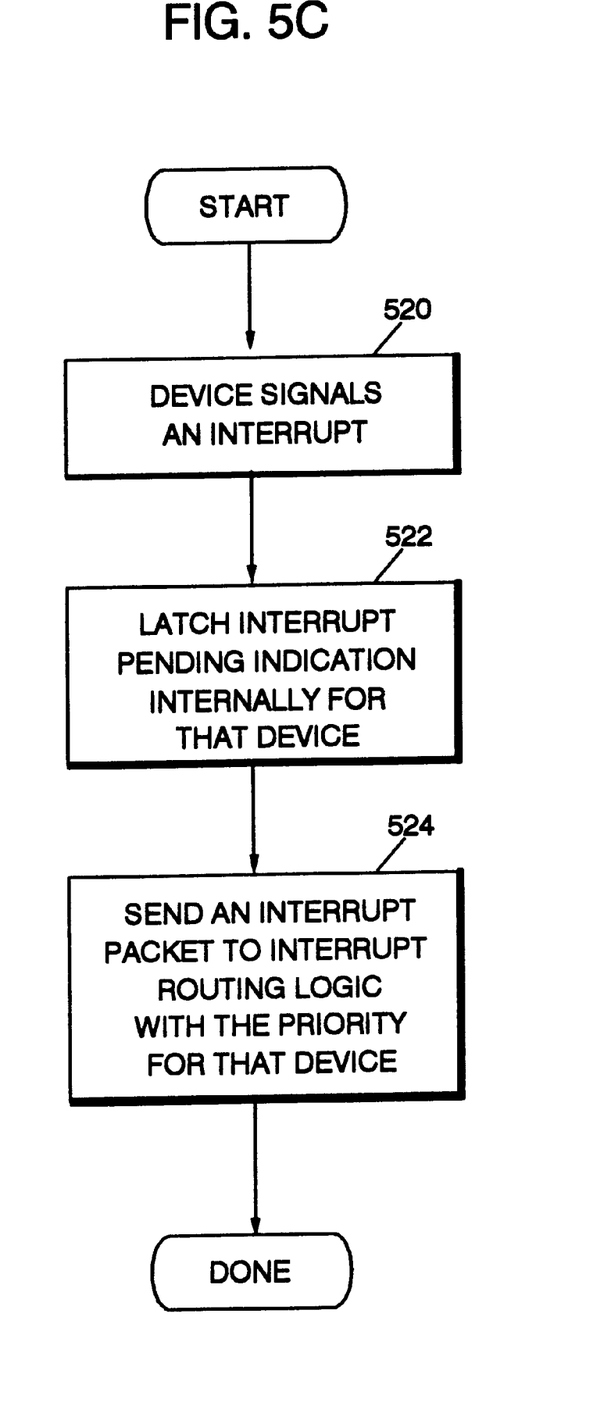

FIG. 5C shows the handling of interrupts from a device by an I/O bridge.

Figure 5D:
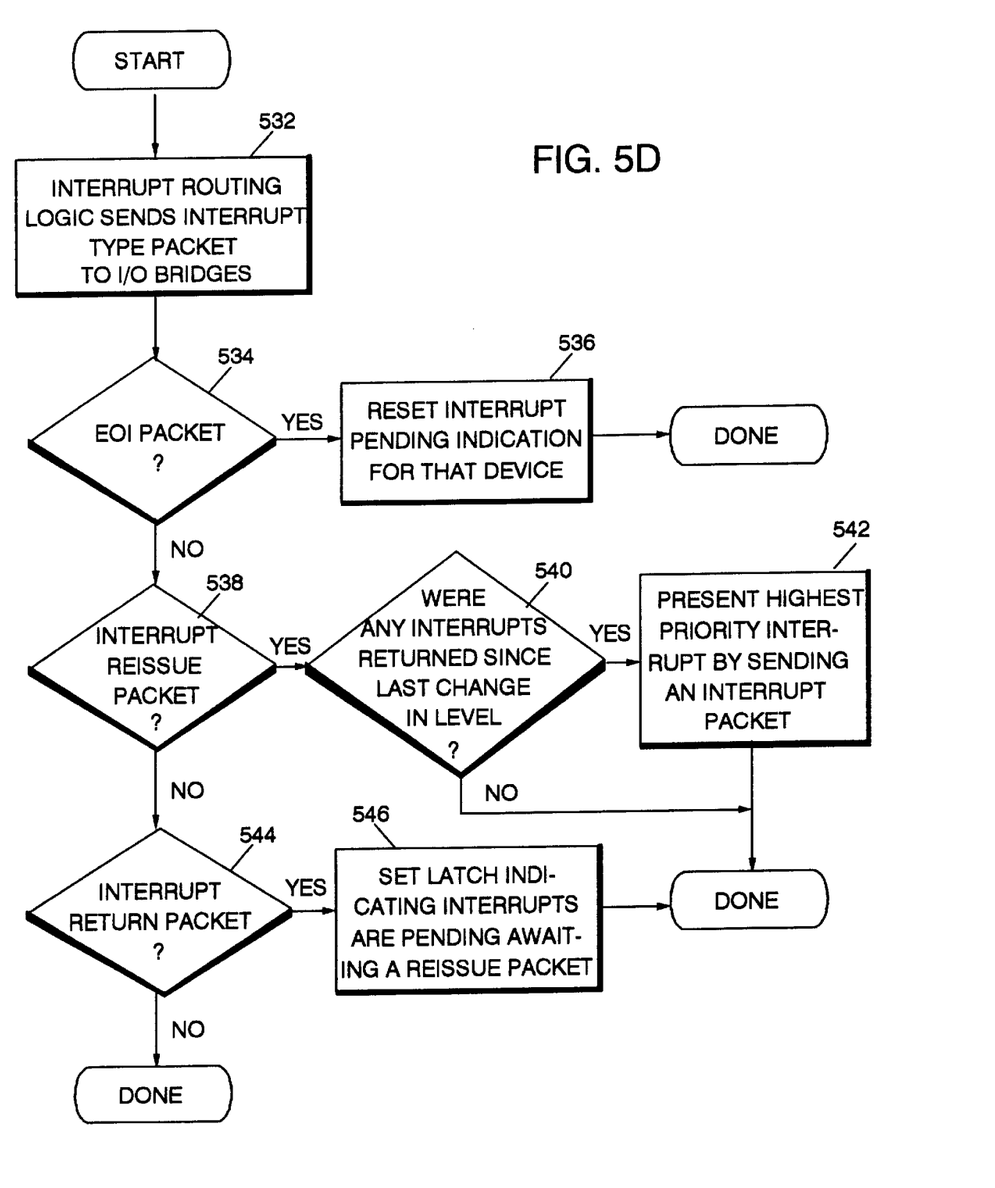

FIG. 5D shows the handling of interrupt signals from the interrupt routing logic by an I/O bridge.

Referring now to FIG. 5A, interrupt handling process 500 will be described. When interrupt routing logic receives 502 an interrupt packet, the priority is tested 504 to determine whether the new interrupt has a higher priority than the immediately preceding interrupt currently being handled. If the new interrupt has a higher priority, the previous interrupt is replaced with the new interrupt 506, the previous interrupt is returned to the address buses 16 or 26 using the interrupt return packet, command type 2 of interrupt packet format 400. The information system then selects a processor to interrupt (by means beyond the scope of the present invention) and signals 508 an interrupt to the selected processor.

If the new interrupt packet has a lower priority than the previous interrupt, the new interrupt is returned 510 to the address buses using the interrupt return packet, command type 2 of interrupt packet format 400.

Referring now to FIG. 5B, when a processor finishes processing an interrupt 512 and changes the interrupt processing level, an end of interrupt notification signal is sent 514 to the address buses using the interrupt EOI packet, command type 1 of interrupt packet format 400. A test is then made to determine whether any interrupts were returned since the last change in interrupt level 516. If interrupt level has changed, a request 518 is made to I/O devices on all address buses to again present interrupts by sending an interrupt reissue packet, command type 3 of interrupt packet format 400. If no interrupts were returned since the last change in level, this portion of the process is terminated.

Referring now to FIG. 5C, handling of device initiated interrupts by an I/O bridge will be described. A device signals 520 an interrupt. The I/O bridge latches 522 an interrupt pending indication for that device. The I/O bridge sends 524 an interrupt packet on address bus 16 or 26 to the interrupt routing logic with the appropriate priority for the requesting device using command type 0 of interrupt packet format 400.

Referring now to FIG. 5D, the handling of interrupt response signals from the interrupt routing logic will be further described. The interrupt routing logic sends 532 an interrupt type packet to I/O bridges connected to either address bus 16 or 26. A test is made 534 to determine if the packet is an EOI packet command type 1. If yes, the interrupt pending indicator for the identified device is reset 536, and the process terminates. If no, a test is made 538 to determine if the packet is an interrupt reissue packet command type 3. If yes, a test is made 540 to determine whether any interrupts were returned since a last change in interrupt level. If yes, the highest priority interrupt pending is presented 542 again by sending an interrupt packet having command type 0, and the process terminates. If no interrupts were returned since a last change in interrupt level, the process terminates. If the packet issued by the interrupt routing logic is not an interrupt reissue packet 538, a test is made 544 to determine if the packet is an interrupt return packet command type 2. If yes, a latch is set 546 indicating pending interrupts awaiting a reissue packet, and the process terminates. If the packet is not an interrupt return packet, the process terminates.

Figure 6:
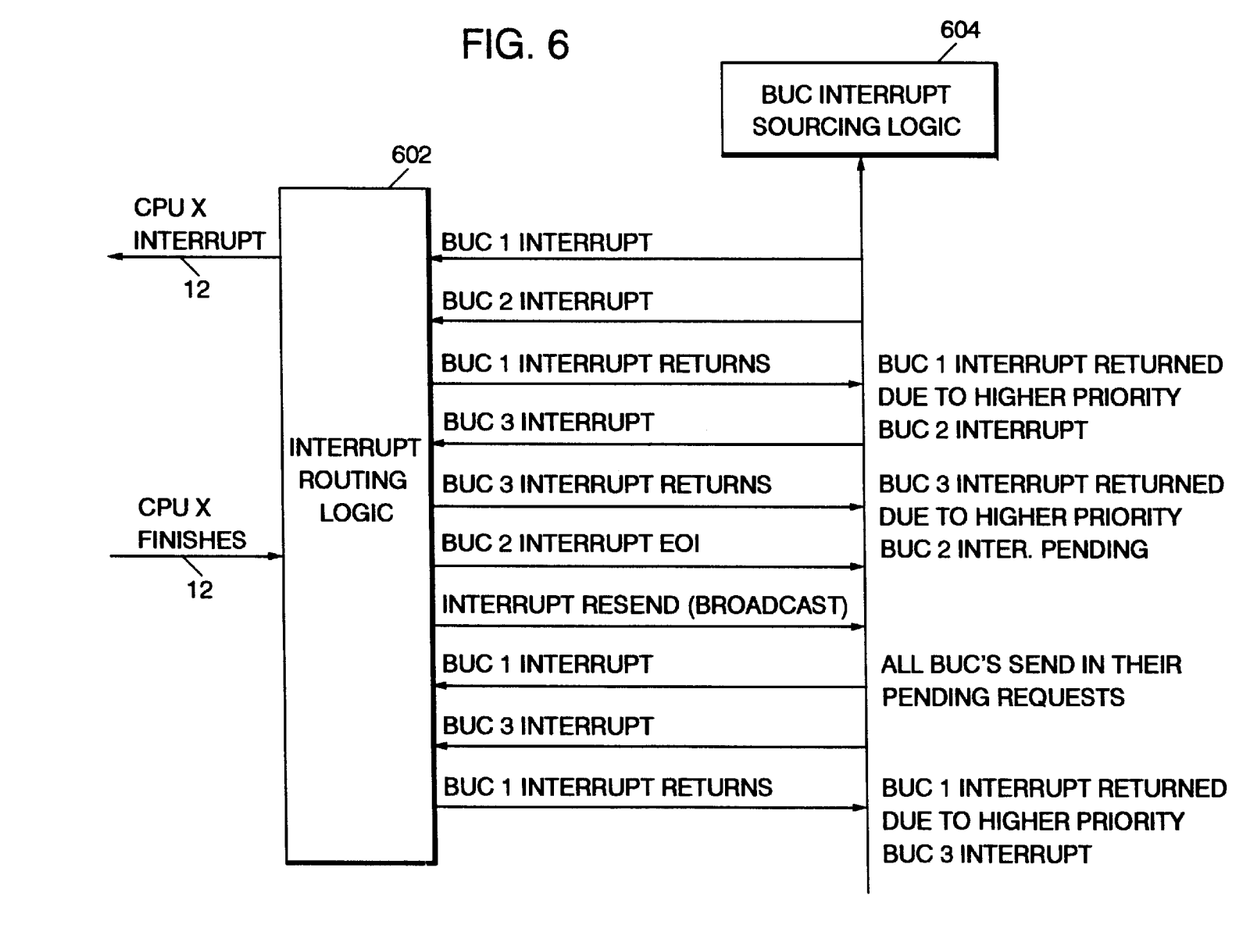
FIG. 6 is an example of an interrupt transaction.

Referring now to FIG. 6, an example of an interrupt transaction will be further described. In the drawing, the abbreviation BUC is used for simplicity. BUC stands for bus unit controller or I/O bridge 32.

The inputs and outputs to central interrupt routing logic 602 are generally in time order from top to bottom of the figure. That is, BUC 1 interrupt occurs before BUC 2 interrupt which occurs before the BUC 1 interrupt returns, etc.

An interrupt having a first priority level BUC 1 is presented to the central interrupt routing logic 602. Interrupt routing logic 602 passes the interrupt to a CPU X 12. A second interrupt is presented by BUC 2 to interrupt routing logic 602. Assuming that the BUC 2 interrupt had a higher priority level than the interrupt presented by BUC 1, the BUC 1 interrupt is returned with command type 2 interrupt return packet. A third interrupt is presented by BUC 3 which is returned since it is presumed that BUC 3 interrupt has a lower priority than the BUC 2 interrupt accepted by CPU X.

Subsequently, the BUC 2 interrupt has been processed, and CPU X generates an end of interrupt (EOI) signal which interrupt routing logic uses to send an end of interrupt packet command type 1 to BUCs connected to any address bus. Next, an interrupt resend signal is broadcast to all BUCs indicating that any pending interrupts may again be presented to the interrupt routing logic 602. Again, the interrupts from BUC 1 and BUC 3 are presented to interrupt routing logic 602, and BUC 1 interrupt is returned since it has a lower priority than the BUC 3 interrupt. The process continues as indicated.

By controlling the presentation of interrupt requests on the address buses, unnecessary traffic on these buses will be eliminated which will improve the bus performance.

It will be appreciated that although a specific embodiment of the present invention has been described herein for the purposes of illustration, various modifications may be made without departing from the spirit or scope of the invention.

Accordingly, the scope of this invention is limited only by the following claims and their equivalents.

What is claimed is:

1. An information handling system comprising:

a plurality of processors having data inputs and outputs and address inputs and outputs;

a single processor data bus, connected to the data inputs and outputs of each processor;

a single processor address bus, connected to the address inputs and outputs of each processor;

a single bus isolation unit, connected to the processor data bus, for controlling information flow to and from each of said plurality of processors via the processor data and address buses, said bus isolation unit further for routing interrupts associated with each of the plurality of processors;

a memory system having data and address inputs and outputs coupled to said bus isolation unit;

an I/O bus having data and address lines connected to said bus isolation unit;

at least one I/O controller connected to the I/O bus and to at least one I/O device, said bus isolation unit further for routing interrupts associated with the at least one I/O device;

said bus isolation unit comprising interrupt routing logic, the interrupt routing logic including:

means for determining upon receipt of an interrupt packet issued from a requesting device if there is more than one interrupt pending for a particular destination device, the particular destination device being one of the following selected from the group consisting of a processor and an I/O device, and if so, if any pending interrupt has a higher priority interrupt than a current interrupt for the particular destination device;

means for returning the interrupt packet of the current interrupt in the form of a return pending interrupt packet to the corresponding requesting device;

means for requeuing the current interrupt at the corresponding requesting device in a pending status register in the form of the return pending interrupt packet until an interrupt reissue signal is transmitted and broadcast by said bus isolation unit to all devices connected to the I/O bus and the address bus, the interrupt reissue signal indicating that the particular destination device has completed processing of a pending interrupt, wherein each previously requesting device holding an interrupt packet in the form of a return pending interrupt packet resends its respective pending interrupt packet in the form of interrupt reissue packet to said bus isolation unit.

2. The information handling system according to claim 1, further comprising:

means for snooping interrupt packets; and means for generating a signal indicating whether a particular interrupt was accepted or rejected.

3. The information handling system according to claim 1, wherein said means for requeuing further comprises:

means for decoding a unit ID field in the current interrupt packet.

4. The information handling system according to claim 1, further comprising:

means for sending an interrupt reissue signal to all I/O devices connected to said I/O bus and to said address bus.

* * * * *